G. M. BATES.
HOOF TRIMMER.
APPLICATION FILED JAN. 2, 1909.

932,671.

Patented Aug. 31, 1909.

Witnesses

Inventor
George M. Bates.
By C. A. Snow & Co.
Attorneys

UNITED STATES PATENT OFFICE.

GEORGE M. BATES, OF LEBANON, MISSOURI.

HOOF-TRIMMER.

932,671.

Specification of Letters Patent. Patented Aug. 31, 1909.

Application filed January 2, 1909. Serial No. 470,282.

*To all whom it may concern:*

Be it known that I, GEORGE M. BATES, a citizen of the United States, residing at Lebanon, in the county of Laclede and State of Missouri, have invented a new and useful Hoof-Trimmer, of which the following is a specification.

The objects of the invention are, generally, the provision in a merchantable form, of a device of the above mentioned class, which shall be inexpensive to manufacture, facile in operation, and devoid of complicated parts; specifically, the provision of a hoof trimmer which shall be adjustable to hoofs of different sizes, which may be readily grasped and operated, and which shall trim the hoof of the animal rapidly, accurately, and without undue exertion upon the part of the operator; other and further objects being made manifest as the description of the invention progresses.

The invention consists in the novel construction and arrangement of parts, hereinafter described, delineated in the accompanying drawings, and particularly pointed out in the appended claims, it being understood that divers changes in the form, proportions, size and minor details of the structure may be made without departing from the spirit or sacrificing any of the advantages of the invention.

Similar numerals of reference are employed to denote corresponding parts throughout the several figures of the drawings.

Figure 1:
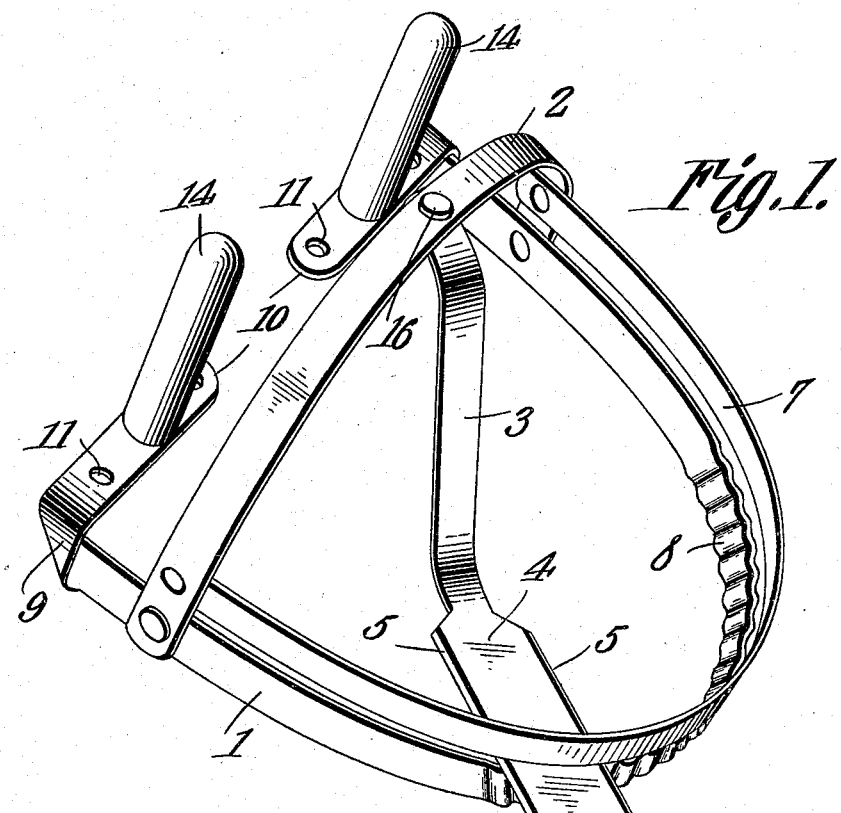
Figure 2:
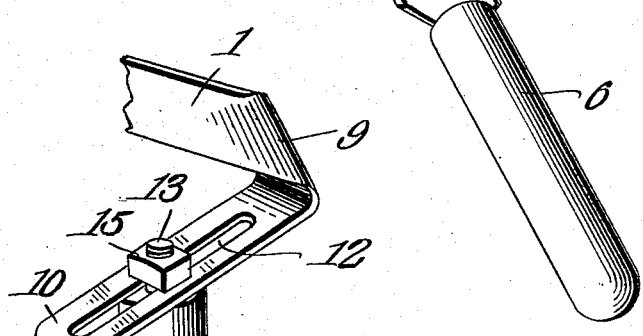

In the accompanying drawings:—Figure 1 shows my invention in perspective; Fig. 2 is a detail perspective view of the handle, the same being mounted in an arm of modified construction.

In carrying out my invention I provide, primarily, a U-shaped body member 1. The crown of the body member is roughened in order to cause it readily to engage the hoof of the animal; in its preferred form the body member 1 is provided with transversely disposed corrugations 8. The ends of the body member 1 are bent upon themselves, as shown at 9, to form arms 10 lying in a plane normal to the plane of the body member 1. The arms 10 may, as shown in Fig. 1, be provided with apertures 11 or, if desired, they may be equipped with the longitudinal slot 12 shown in Fig. 2. I further provide handles 14 arranged to upstand from the arms 10. The lower terminals of the handles 14 are threaded, as denoted by the numeral 13, the threaded portion being passed through the apertures 11 of Fig. 1, or through the slot 12 of Fig. 2, should that form be employed, nuts 15 being mounted upon the threaded terminals 13 of the handles, the said nuts 15 being designed to draw the handles into close relation with the arms and to firmly retain them in position.

From the U-shaped body member 1 near its terminals rises an arch piece 2. The guide member 7 is disposed substantially in the plane of and above the body member 1 and has its terminals attached to the arch piece 2. The cutter denoted in general by the numeral 3 has one of its terminals pivoted to the crown of the arch piece 2, as shown at 16, the said cutter being downwardly bent to contact with the body member 1. The cutter 3 is broadened to form a blade proper 4 having its opposite edges sharpened as denoted by the numeral 5, the blade proper being disposed substantially parallel to the body member 1 and being arranged to reciprocate on the pivotal connection 16 between the body member 1 and the guide member 7. The outer terminal of the blade proper 4 is reduced beyond the body member 1 and provided with a suitable handle 6, whereby the cutter may be operated.

With the exception of the handles 14 and the cutter 3, the entire device is fashioned from resilient material in order to accommodate hoofs of different sizes and shapes. The apertures 11 shown in Fig. 1 and the slot 12 shown in Fig. 2 furnish means, whereby the space between the handles 14 may be regulated to provide for hoofs of different sizes and for any diversity which may exist between the size of the hands of different operators.

In practical operation, the device is placed upon the hoof of the animal and the handles 14 are grasped drawing the instrument tightly upon the hoof, the corrugations 8 aiding in preventing the movement of the implement. The cutter 3 is then caused to reciprocate between the members 1 and 7, the member 7 serving to guide the cutter and to limit its movement.

Having thus described my invention what I claim as new and desire to protect by Letters Patent is:—

1. A hoof trimmer comprising a resilient U-shaped body member; handles adjustably carried by the terminals of the body member; a resilient arch piece terminally connected with the body member; a resilient U-shaped guide member alined with the body member and terminally connected with the arch piece; a cutter having one of its terminals pivoted to the arch piece, its other terminal being downbent and disposed between the guide member and the body member.

2. A hoof trimmer comprising a resilient U-shaped body member, arms projecting inwardly toward each other from the extremities of the said body member, handles adjustably carried by the said arms, a resilient arch piece connected with the body member, a resilient U-shaped guide member alined with the body member and terminally connected with the arch piece, and a cutter having one of its terminals pivoted to the arch piece, the body of the cutter extending between the guide member and the body member.

3. A hoof trimmer comprising a resilient U-shaped body member, arms projecting inwardly toward each other from the extremities of the said body member, said arms being provided with openings, and handles having terminals engaged through the openings in the arms and adjustable with respect to the respective arms, a resilient arch piece terminally connected with the body member, a resilient U-shaped guide member alined with the body member and terminally connected with the arch piece, and a cutter having one of its terminals pivoted to the arch piece, the body of the cutter extending between the guide member and the body member.

In testimony that I claim the foregoing as my own, I have hereto affixed my signature in the presence of two witnesses.

GEORGE M. BATES.

Witnesses:
J. B. LAMBETH,
A. P. DRAPER.